Patented July 24, 1928.

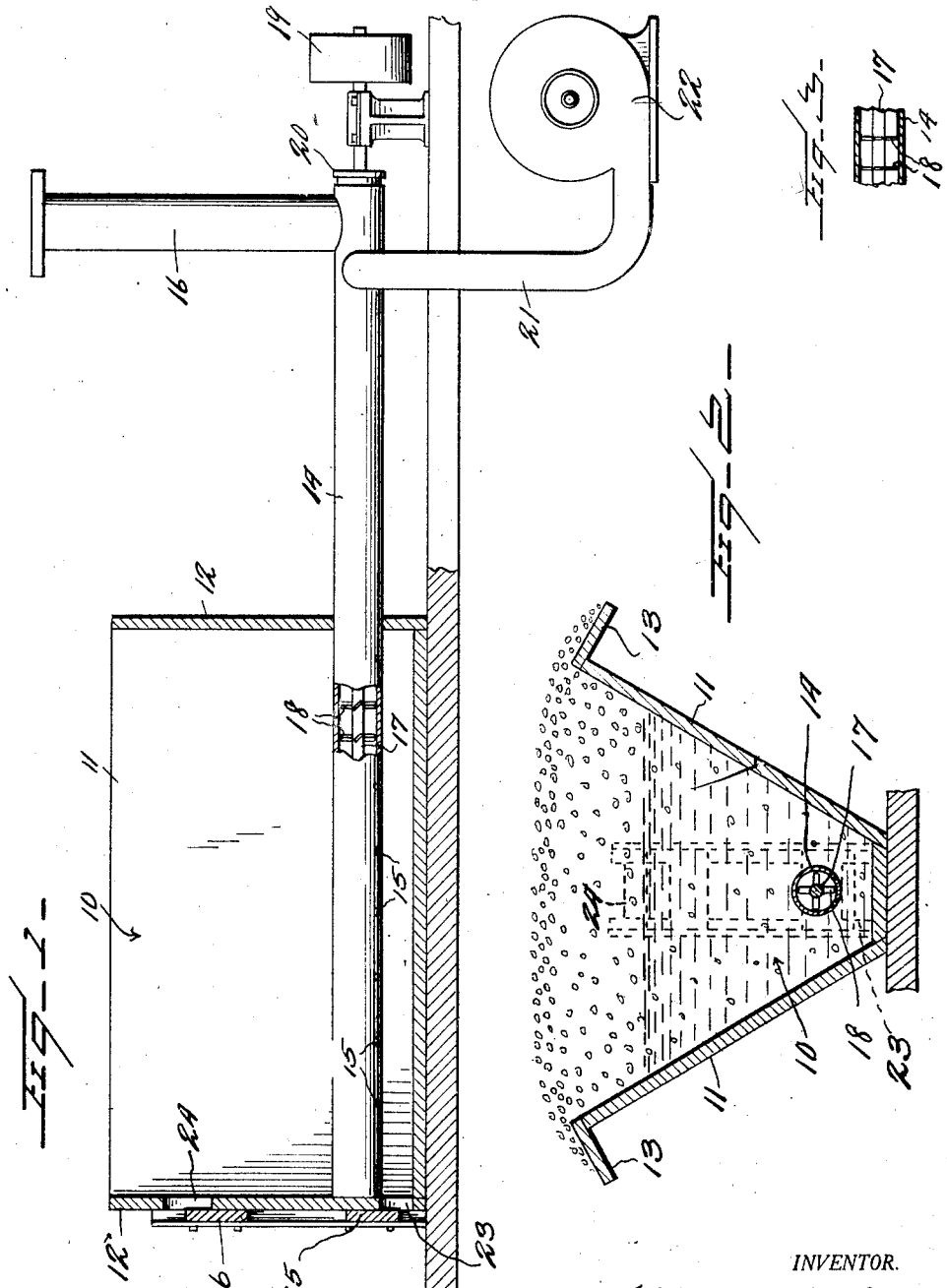

1,678,087

UNITED STATES PATENT OFFICE.

EDWARD HASKINS SHACKELFORD, JR., OF JOPLIN, MISSOURI, ASSIGNOR TO HEBBARD MANUFACTURING COMPANY, OF JOPLIN, MISSOURI, A CORPORATION OF MISSOURI.

FLOTATION MACHINE.

Application filed August 30, 1927. Serial No. 216,461.

This invention relates to ore concentrators using the flotation principle, and particularly to means for feeding pulp into the spitzkasten and beating up this pulp with air so as to form the necessary bubbles of oil mixed with the pulp.

The general object of the present invention is to provide a very effective means for this purpose in which the pulp or material to be treated enters a vertically disposed intake and is discharged at the lower end of the intake into a longitudinally extended beater where the pulp and oil are mixed with air injected from a blower or other source of air pressure, the beater eventually discharging the oil, air and pulp into the spitzkasten, this mechanism securing a very effective aeration of the mixed oil and pulp and a thorough mixing of the mass and the separation of the mineral concentrate from the fine and coarse sand.

The invention is illustrated in the accompanying drawing, wherein:—

Figure 1 is a longitudinal sectional view of a flotation machine constructed in accordance with my invention;

Figure 2 is a transverse section through the spitzkasten;

Figure 3 is a fragmentary elevation of the mixing shaft provided with mixing blades which are radially disposed.

Referring to this drawing, which is somewhat diagrammatic in character inasmuch as the details of construction may be varied in many ways without departing from the spirit of the invention, 10 designates the spitzkasten which has preferably inwardly and downwardly converging side walls 11 and end walls 12, with the launders 13 over which the floating bubbles are discharged. Extending entirely through the spitzkasten adjacent the bottom thereof and extending beyond the spitzkasten is a pipe casing 14 which, within the spitzkasten, is formed with a plurality of discharge openings 15 arranged adjacent the bottom of the pipe. This pipe 14 may extend through this spitzkasten from end to end. The pipe 14 extends beyond the inlet end of the spitzkasten to any desired extent and discharging into the inlet end of this pipe 14 is the intake column 16 into which the mixed oil and pulp are discharged.

Extending longitudinally through the pipe 14 to the extremity thereof is a shaft 17 which carries upon it a plurality of blades 18. These blades may be radial to the axis of the shaft or the blades may be set so as to have a slight screwing action. The shaft 17 may be rotated in any suitable manner and I have illustrated a band wheel 19 for this purpose. The shaft passes through the stuffing box 20.

Communicating with the pipe 14 adjacent the inlet of the intake column 16 is an air pipe 21 which may communicate with a blower 22 or any other means for discharging air into the pipe under more or less pressure. Where the pulp is drawn through the pipe 14 as, for instance, by means of blades 18 which are helically arranged upon the shaft, the blower 22 may be omitted and the pipe 21 may be simply an air inlet pipe.

At the discharge end of the spitzkasten there is provided a lower opening 23 which is disposed practically at the bottom of the spitzkasten and will take care of the coarse sand, and above this opening 23 is an opening 24 arranged to control the overflow of water from the spitzkasten and thus control the water level. Two gates 25 and 26 may be provided for controlling these openings. A float valve may be arranged to control the gate so as to automatically take care of the water level or the gate may be controlled by hand.

In the use of this machine, the pulp or material to be floated enters the intake column 16 at the top thereof and this pulp has been previously mixed with the oils necessary for the flotation process. The paddles or blades 18 mix this oil and pulp thoroughly together and beat it up with the air entering through the pipe 21. The pulp is aerated and thoroughly mixed with the oil in its passage along the pipe 14 and the mixture is finally discharged out of the holes 15 into the spitzkasten. The pulp is now entirely aerated and mixed with the flotation oil and the bubbles of oil mixed with the pulp in the spitzkasten rise to the surface coated with the mineral to be floated and are discharged over the sides into the launders.

It has heretofore been the practice to either mix the oil with the pulp and aerate the pulp by mechanical means or by pneumatic means. My invention provides for aerating the pulp and mixing it with float oils both by mechanical and pneumatic means and this mechanism has been found much more efficient than either the pneumatic or mechanical systems taken by themselves. The pipe 14 may be of any desired length so as to secure a thorough and efficient mixing of the ingredients and the air, as before remarked, may be either blown into the pipe 14 by means of the blower 22 or, if the pulp is caused to move through the pipe 14 by means of slightly spiral blades on the beater, the air will be drawn in with the pulp and thoroughly beaten up therewith.

Obviously, this mechanism might be modified in many ways without departing from the spirit of the invention and, therefore, I do not wish to be limited to any of the details illustrated except as defined in the appended claims.

I claim:—

1. A flotation concentrator of the character described including a spitzkasten, an elongated casing entering the bottom of the spitzkasten and extending longitudinally therealong and formed with openings discharging into the spitzkasten, means disposed within the casing for mixing pulp and oil, and means for discharging pulp into the entrance end of said casing and discharging the air into this entrance end.

2. A flotation concentrator of the character described including a spitzkasten, an elongated tubular casing extending from the exterior of the spitzkasten into and longitudinally through the same and formed with a plurality of discharge openings within the spitzkasten, said tubular casing having an intake column remote from the spitzkasten and through which pulp and oil are discharged into the casing, means disposed within the tubular casing and extending longitudinally for substantially the entire length thereof whereby the pulp and oil may be thoroughly agitated, and means for admitting air into the entrance end of said tubular casing.

3. A concentrator of the character described including a spitzkasten, an elongated tubular casing entering the spitzkasten and extending entirely therethrough, the casing having openings discharging into the spitzkasten through the bottom of the casing, an intake column discharging oil and pulp into the entrance end of the tubular casing, a shaft extending through the tubular casing having beater blades, and means at the end of the tubular casing adjacent the intake whereby air may be admitted to the casing.

4. A flotation concentrator of the character described including a spitzkasten having downwardly convergent side walls and having discharge openings at one end, an elongated tubular casing entering the spitzkasten through the other end thereof and having discharge openings discharging toward the bottom of the spitzkasten, a vertical feed column opening into the end of the tubular casing remote from the spitzkasten, a shaft extending through the spitzkasten and having slightly helical blades thereon extending substantially the full length of the tubular casing, an air pipe entering the casing adjacent the intake column, and means for forcing air into the casing through said pipe.

In testimony whereof I hereunto affix my signature.

EDWARD HASKINS SHACKELFORD, Jr.